United States Patent Office 2,928,817
Patented Mar. 15, 1960

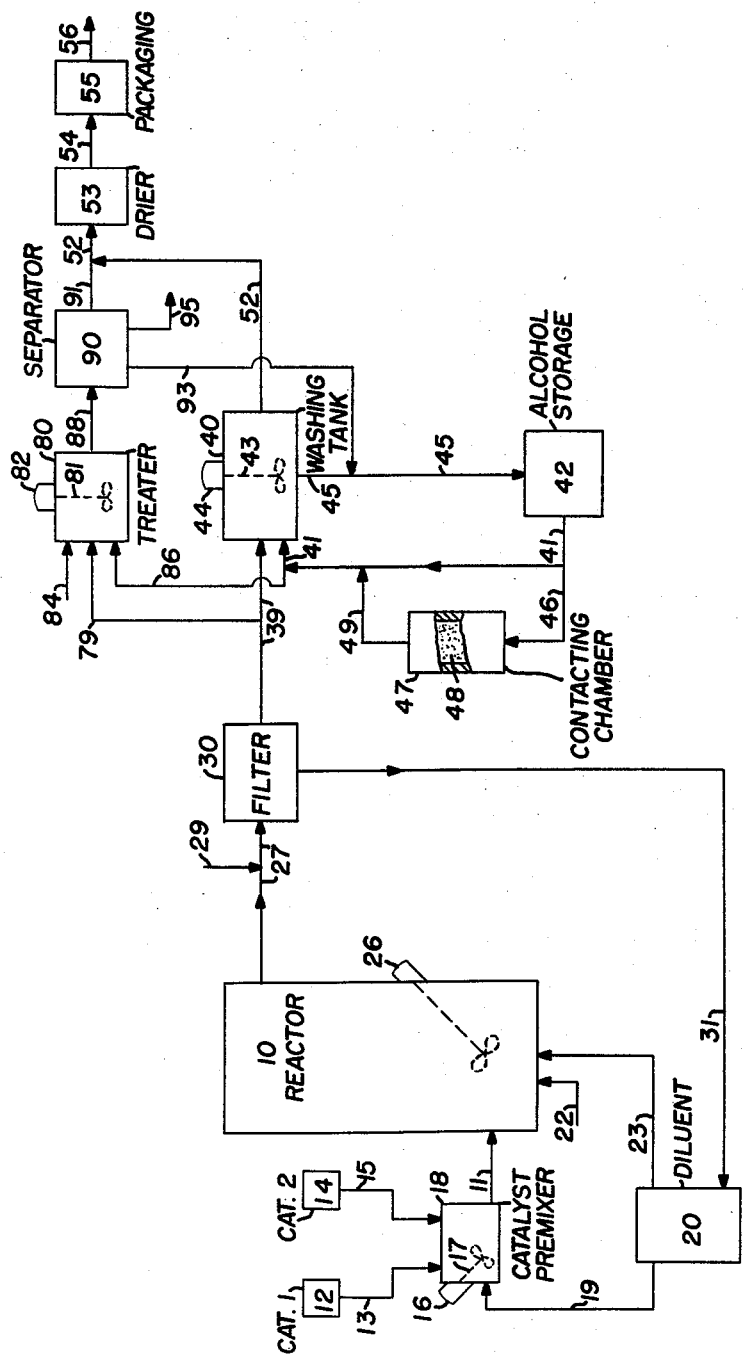

2,928,817

REMOVAL OF METAL CONTAMINANTS IN POLYMERIZATION PROCESSES

Arthur Homer Neal and James Francis Ross, Baton Rouge, La., assignors to Esso Research and Engineering Company, a corporation of Delaware Application April 4, 1956, Serial No. 576,123

6 Claims. (Cl. 260—94.9)

This invention relates to polymerization and more particularly relates to the removal of metal contaminants in polymerization processes. Still more particularly, the present invention relates to an improved method for removing metal contaminants from polymeric products and washing agents in a polymerization process wherein monomers are polymerized in the presence of a catalyst obtained by mixing reducing metal compound with reducible metal compound.

The art is well familiar with the preparation and uses of a wide variety of polymeric products. More specifically, polymeric products are used in a wide variety of applications such as for plastics, film-forming materials, tires, lubricant additives and the like. Many of these polymeric products are prepared employing metal compounds as catalysts in the polymerization reaction. In many instances it is highly desirable to prepare a polymeric product having a low metal content. For example, the presence of metals (or ash-forming ingredients) unfavorably affects the electrical properties and color of the polymeric products.

Recently a new method has been developed for preparing polymeric products wherein monomers are polymerized in the presence of a catalyst obtained by mixing a reducing metal compound (e.g., aluminum trialkyl or dialkyl aluminum chloride) with a reducible metal compound (e.g., titanium tetrachloride). See Ziegler, Belgian Patent 533,362 of May 16, 1955. This type of catalyst has come to be commonly known as a "Ziegler catalyst," and the polymerization process itself has come to be identified as the "Ziegler process." This process has been found to be both economical and effective. Perhaps the most serious problem encountered in this process is the presence of a relatively high proportion of metal contaminants in the final polymeric products. Conventional polymer purification techniques have been generally unsuccessful in reducing the proportion of metal contaminants or ash-forming ingredients below the levels desired for good color and good electrical properties. Thus the finding of a method for reducing the proportion of metal contaminants in the polymeric products prepared by this method is essential to its commercial success in a number of fields of application.

It is highly desirable in this new polymerization process to recycle the washing agents to the process. For the most effective operation, it is desirable to remove metal contaminants from these washing agents. Thus there is also a need for an effective method for removing metal contaminants from the washing agents used in this new polymerization process.

A novel method has now been found for removing metal contaminants from the polymeric products and washing agents employed in the polymerization process wherein monomers are polymerized in the presence of polymerization catalyst obtained by mixing reducing metal compound with reducible metal compound. More particularly, the improved process of the present invention comprises washing the polymeric product with a non-aqueous liquid wash solution containing a chelating agent to remove metal contaminants from the polymeric product and contacting the wash solution containing the chelating agent with ion exchange resin to remove metal contaminants from the wash solution. Preferably the ion exchange resin treated wash solution is then recycled to the washing step. The preferred wash solutions are alcohols containing small amounts of a 1,3 dicarbonyl compound, preferably acetyl acetone.

It has been found that the incorporation of the chelating agent in the wash solution substantially increases the effectiveness of metal removal from the wash solution by the ion exchange resin. This is quite surprising as generally it would be expected that a metal chelating agent would tend to hold the metal ions and not readily permit transfer of the metal ions to other materials such as ion exchange resins. The fact that the chelating agent increases the effectiveness of removal of metal contaminants from the wash solution by the ion exchange resin results in a further advantage of the present invention. More particularly, this means that a purer wash solution can be recycled to the process for washing additional polymer which in turn results in the production of a purer polymeric product, i.e., one having a lower content of metal contaminants.

The present invention is particularly applicable to the polymerization of ethylene to form polyethylene, and it is particularly preferred to employ as ion exchange resins the acid forms of sulfonated styrene-divinyl benzene ion exchange resins. The new type of polymerization process is conventionally carried out by polymerizing monomers such as ethylene in the presence of an inert liquid diluent and a polymerization catalyst obtained by mixing a reducing metal compound with a reducible metal compound in an inert liquid diluent. Upon completion of the polymerization reaction, the polymeric product such as polyethylene is separated usually by filtration from the remainder of the reaction mixture (which is principally the inert liquid diluent), and then the separated polymeric product is washed with a liquid washing agent, dried and packaged.

The catalyst employed in this type of polymerization reaction is formed simply by mixing a metal compound having reducing properties with a reducible metal compound in the presence of an inert liquid diluent. More particularly, the metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, these aluminum compounds have the general formula

where R and R' are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. The most commonly used aluminum compounds are (1) dialkyl aluminum monohalides containing about 2 to 4 carbon atoms in the alkyl groups and chlorine or bromine atoms, particularly chlorine atoms, (2) aluminum trialkyls containing about 2 to 4 carbon atoms in the alkyl groups and (3) mixtures of (1) and (2).

The reducible metal compound is one of a metal of groups IV-B, V-B, VI-B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, freshly precipitated oxides or hydroxides, organic compounds such as alcoholates, acetates, benzoates or acetyl acetonates. The most commonly used salts are those of titanium, zirconium, thorium, uranium and chromium. Titanium salts are particularly useful, such as titanium tetrachloride, titanium oxychloride or titanium acetyl acetonate.

If desired, a pre-reduced reducible metal compound may be employed as the polymerization catalyst in lieu of the mixture of reducing metal compound with reducible metal compound. An example of a pre-reduced reducible metal compound is titanium trichloride. Mixtures of two or more pre-reduced reducible metal compounds, as well as mixtures of pre-reduced reducible metal compounds with reducing metal compounds, may also be employed as polymerization catalysts.

As stated above, the catalyst mixture is prepared simply by mixing the metal compound having reducing properties with the reducible heavy metal compound in the presence of an inert liquid diluent. Generally the molar ratio of the reducing metal compound to the reducible metal compound is in the range of about 1:5 to 12:1, more preferably about 1:2 to 3:1. The catalyst mixture is prepared generally using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours. The optimum conditions for preparing the catalyst depend in large measure on the particular aluminum alkyl used as the reducing agent. For example, aluminum triethyl can be employed using relatively low concentrations and temperatures to form an active catalyst. On the other hand, when using aluminum diethyl chloride at approximately .5 weight percent concentration, heating times of about 15 to 30 minutes at temperatures of about 120 to 140° F. give the most active catalyst. When the two catalyst components are mixed in the presence of the inert liquid diluent, a precipitate is generally formed which is insoluble in the inert liquid diluent.

A wide variety of polymeric products can be prepared by employing the above-described catalysts mixtures of a reducing metal compound with a reducible metal compound. These catalysts are particularly effective for polymerizing ethylene but are also effective for preparing other homopolymers or copolymers, particularly those of olefinic hydrocarbon monomers. For example, polypropylene and copolymers of ethylene and propylene can be prepared by this polymerization method.

Generally an inert liquid diluent will be employed in the polymerization process to facilitate the polymerization reaction. The amount of the inert liquid diluent employed in the polymerization process should be such that the final polymeric product in the reaction mixture does not exceed about 40 weight percent so that a relatively fluid reaction mixture is produced. Generally the amount of inert diluent is such that the polymeric product in the final reaction mixture is in the range of about 1% to 25% by weight. The proportion of catalyst, based on the inert liquid diluent, will generally be in the range of about 0.05 to 0.5 weight percent, usually about 0.1 to 0.3 weight percent.

The inert liquid diluents employed in the preparation of the catalyst as well as in the polymerization reaction itself are preferably hydrocarbons or halogenated hydrocarbons. More particularly, aliphatic hydrocarbons, aromatic hydrocarbons, halogenated aliphatic hydrocarbons and halogenated aromatic hydrocarbons as well as mixtures thereof may be employed. One particular class of inert liquid diluents which is employed quite extensively is the $C_5$ to $C_{10}$ saturated aliphatic hydrocarbons including pentane, hexane, heptane, octane, nonane and decane. Aromatic hydrocarbons such as benzene, toluene, xylenes, may also be employed. Also, halogenated hydrocarbons such as chlorobenzene, chloroform, bromobenzene, and bromoform, may be employed. Also, highly refined mineral or petroleum oils boiling within the range of about 300° F. to 750° F. (e.g. 350° F. to 550° F.) may be employed as inert liquid diluents. In addition to the inert liquid diluents mentioned above, other suitable diluents include saturated cyclic paraffin such as cyclohexane, cyclopentane, methyl cyclohexane.

The polymerization reaction conditions, that is, time, temperature and pressure, are adjusted to produce polymers or copolymers having molecular weights generally of at least about 2,000, usually at least about 10,000. Polymeric products having molecular weights up to 2,000,000 to 5,000,000 or higher may be prepared. Generally, temperatures in the range of about −40 to 200° C., usually about 20° to 80° C. (e.g., about 50° to 60° C.) are employed. Higher temperatures can be employed if desired, but temperatures above about 250° C. are undesirable generally since the catalyst decomposes to a considerable extent at this temperature. In general, pressures in the range of about 1 to 250 atmospheres or higher are employed. If desired, subatmospheric pressures can be employed with certain monomers. The polymerization of ethylene can be carried out conveniently by employing pressures of about 1 to 10 atmospheres. An advantage of this process is that relatively low pressures can be employed. In order to obtain polymeric products having molecular weights above about 2,000, a polymerization reaction time of at least about 15 minutes will be required. Generally, polymerization reaction times in the range of about 15 minutes to 24 hours, usually about 1 to 6 hours, will be employed.

Upon completion of the polymerization reaction, the polymeric product is conventionally separated from the reaction mixture by filtration or distillation, the polymeric product washed with materials such as alcohols and then dried by heating, preferably under vacuum. Washing agents which are conventionally employed in the polymerization process include alcohols, acetone, esters, ethers, Cellosolves, and aqueous acids such as HCl.

In accordance with the present invention the polymeric product which is separated from the polymerization reaction mixture (by filtration, distillation, etc.) is washed with a non-aqueous liquid wash solution containing a chelating agent. Generally, the major proportion of the wash solution will be a conventional washing agent of the type mentioned above. It is particularly preferred in the present invention to employ alcohols as the washing agent. Preferably these alcohols or alkanols have the formula

ROH where R is an alkyl radical of 1 to 5 carbon atoms, such as methyl alcohol, ethyl alcohol, isopropyl alcohol and n-butyl alcohol.

The above-described washing agents are combined in accordance with the present invention with a small amount of a chelating agent. More particularly, the preferred chelating agents useful in the present invention are 1,3 dicarbonyl compounds such as diketones, keto esters and/or keto acids (the diketones and keto esters are particularly effective in removing metal contaminants from polymers, especially polyethylene). The preferred keto compounds useful in the present invention have the formula

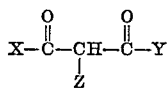

where X, Y and Z are similar or different groups chosen from the following (1) H
(2) OH
(3) OR where R is a saturated aliphatic group containing 1 to 6 carbon atoms
(4) R' where R' is a saturated aliphatic group containing 1 to 6 carbon atoms
(5) R'' where R'' is an aromatic or substituted aromatic group Particularly preferred 1,3 dicarbonyl compounds have the following formula:

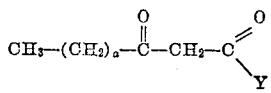

where "a" is an integer having a value of 0 to 3 and Y represents a member selected from the group consisting of the radicals OR and R', R and R' preferably representing alkyl radicals containing 1 to 4 carbon atoms. Specific examples of the 1,3 carbonyl compounds useful in this invention include the following:

| Example | X | Y | Z |
| --- | --- | --- | --- |
| 1 | $CH_3$ | $CH_3$ | H |
| 2 | $CH_3$ | $OC_2H_5$ | H |
| 3 | $C_2H_5$ | $OCH_3$ | H |
| 4 | $C_2H_5$ | $OCH_3$ | $CH_3$ |
| 5 | $C_2H_5$ | $C_2H_5$ | H |
| 6 | $CH_3$ | $C_2H_5$ | $CH_3$ |
| 7 | $CH_3$ | H | H |
| 8 | H | H | H |
| 9 | $C_6H_5$ | $CH_3$ | H |
| 10 | $C_6H_5$ | $C_6H_5$ | H |
| 11 | $CH_3$ | OH | H |

The preferred chelating agents of the present invention are acetyl acetone (Example 1 above) and ethyl aceto acetate (Example 2 above) since these chelating agents are particularly effective for the purposes of the present invention.

Generally the wash solution employed in the present invention will contain about 90 to 99.9%, preferably about 95 to 99.5%, by weight of washing agent (e.g. alcohol) and about 0.1 to 10.0%, preferably about 0.5 to 5%, by weight of chelating agent. Generally about 1 to 6, usually about 2 to 4 gallons of wash solution will be employed per pound of the polymer product. The washing operation may be carried out on a batch or continuous basis and may also be carried out in a single or multistage operation.

The ion exchange resins employed in the present invention are cation exchange resins which are in the acid form. The present invention is particularly advantageously carried out using sulfonated (or phosphonated) polystyrene resins and especially sulfonated polystyrene resins which contain as constituent monomers about 50 to 99 weight percent of styrene and about 1 to 50 weight percent of divinyl benzene, preferably 75 to 98% by weight of styrene and 2 to 25 weight percent of divinyl benzene, and especially about 84 to 98 weight percent of styrene and 2 to 16 weight percent of divinyl benzene. Such resins are well known in the art and are marketed commercially and are therefore particularly useful in the present invention. It will be understood, however, that the present invention is also applicable to other ion exchange resins. For example, instead of styrene, it is permissible to use other monovinyl aromatic compounds such as p-methyl styrene, p-ethyl styrene, α-methyl styrene, α-methyl p-methyl styrene or other dimethyl styrenes, p-chlorostyrene, dichlorostyrenes, and so forth. While, in general, compounds having the vinyl group in para position to the alkyl or halogen substituents are preferred, other isomers are similarly useful also. Likewise, instead of using divinyl benzene as the chemical cross-linking agent, other polyvinyl aryl compounds may be used such as divinyl toluene, divinyl xylene, divinyl ethyl benzene, divinyl chlorobenzene, divinyl ethers, divinyl naphthalene, and the like. It will also be understood that the present invention is applicable to such resins containing minor amounts of monomers other than styrene and divinyl benzene (or similar compounds) such as, for example, butadiene, isoprene and isobutylene.

These resins may be prepared in a variety of ways from a variety of raw materials. For instance the sulfonation or equivalent acid treatment may be applied to a monomer such as styrene which is subsequently polymerized into a suitable high molecular weight ion-exchange resin. Preferably, however, the organic resin is formed first and then the acid groups are introduced by treating the solid resin in suitably subdivided or granulated form.

The polymerization of the aforementioned ingredients can be carried out by any of the well-known methods, e.g., by simple heating at an elevated temperature such as 100° C. for a suitable length of time, such as 10 days. However, it is preferable to use a catalytic amount of an oxygen-yielding compound such as benzoyl peroxide, ammonium persulfate, potassium persulfate, sodium perchlorate, sodium perborate, ozone, ozonides, etc., with temperatures of about 20–120° C., and a polymerization time inversely of a week to as short as a few hours. The polymerization can be carried out either in homogeneous phase or in emulsion. For instance, satisfactory materials can be prepared according to the procedure described in Patent No. 2,089,444 or 2,500,149. Depending on the technique employed, the polymeric resin can be produced either in the form of nearly spherical hard granules of a proper size for further use, or the polymeric resin can be produced in the form of larger masses which are reduced to the desired particle size by crushing or cutting.

In making the aforementioned organic materials into the desired cation-exchange resins, they are sulfonated (or phosphonated) in a manner otherwise well known so as to introduce on the average about 0.25 to 3, preferably about 0.5 to 2, inorganic acid radicals per benzene nucleus of the polymeric resin. Suitable sulfonation agents include concentrated or fuming sulfuric acid, chlorosulfonic acid, sulfur trioxide in nitrobenzene, etc. An excess of the sulfonating agent is used. Depending on the sulfonating agent used, temperature of sulfonation may be in the range of about −20° to 200° C., preferably −20° to +50° C. in the case of chlorosulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e.g., one containing 90% of combined styrene and 10% of combined divinyl benzene, can be mixed with an excess of chlorosulfonic acid, e.g., about 6 parts acid per quart of copolymer, briefly heated at reflux temperature for about 3 minutes and subsequently the mixture is held at room temperature for about 50 hours. Finally, a large excess of water is added to the mixture, and the latter is then filtered, washed and dried. In a typical operation a yield of about 235% of sulfonated resin (based on copolymer) is thus obtained. This sulfonated resin contains an average of about 1.77 sulfonic acid groups in each of its aromatic nuclei. At lower temperatures a less extensively sulfonated product is obtained, e.g., one containing a single sulfonate group per aromatic ring.

To minimize physical disintegration of the hard copolymer during sulfonation, the granules may first be swelled in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e.g., 98% sulfuric acid.

The sulfonation reaction starts at the surface of each granule and is continued until the entire granule has been penetrated by the acid to give a complete reaction. The strength of the acid decreases as the sulfonation proceeds. After completion of the reaction, the remaining acid is washed out with water, or first neutralized and then washed. As water replaces the acid, further swelling of the granules may occur, up to about 25%. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is generally saturated with water and is in a swollen state. Thus, commercially available sulfonated resins normally contain from about 40 to 70% water. It is advisable to store such resins in water-tight containers under conditions which will prevent drying out of the resin as undue loss of this water content may lead to disintegration of the granules upon subsequent contact with water. For instance, a resin originally containing 55% moisture may be dried out at 60% relative humidity to an equilibrium moisture content of only about 30%. When such a partially dried-out resin is placed in water, water absorption may be so rapid that severe disintegration of the granules takes place.

It will be understood, of course, that the described polystyrene type ion-exchange resins as well as their preparation are well known and readily available as commercial products. For instance, a particularly useful resin for purposes of the present invention is a commercial cation-exchange resin known under the trade name Dowex 50X8 and made by the Dow Chemical Company. This is a sulfonated resinous copolymer of about 92% styrene and 8% divinyl benzene, which contains about 44 to 50% moisture and about 12 to 16% sulfur in the sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. All of these materials are brown in color. Another material is Dowex 50WX8 which is cream colored and especially stable in the mechanical sense due to virtually complete absence of internal strains as shown by inspection under polarized light. This material is prepared by introducing the sulfonic acid groups into the polymer under special conditions so that oxidation of the polymer is almost completely avoided.

Other sulfonated polystyrene ion-exchange resins are sold by the Rohm and Haas Company under the "Amberlite" trademark, particularly "Amberlite–IR–120." All of these sulfonic acid type ion-exchange resins are usually sold in the form of sodium salts which can be readily converted or regenerated to the acid type by washing with an aqueous solution of sulfuric or hydrochloric acid in a manner well known by itself. In such regeneration the hydrogen ions of the wash acid replace the sodium ions of the resin. The ion-exchange resins in their free acid form have an acidity of about 1.5 to 10 milliequivalents per gram, depending on the resin base and extent of sulfonation. The preferred commercial resins usually have an acidity of about 5 milliequivalents per gram. Other ion exchange resins may be employed, including the phosphonated resins corresponding to the sulfonated ion exchange resins described above.

The improved process of the present invention will be best understood by reference to the attached drawing which is a diagrammatic showing of a polymerization process for polymerizing monomers in the presence of catalyst obtained by mixing reducing metal compound with reducible metal compound and wherein the polymeric products are washed with the wash solutions of the present invention to remove metal contaminants from the polymeric products and the wash solution is contacted with ion exchange resin to remove metal contaminants from the wash solution.

Referring now to the drawing, reference numeral 10 designates a polymerization reactor employed to polymerize monomers such as ethylene in the presence of a catalyst obtained by mixing reducing metal compound with reducible metal compound. The reducing metal compound employed in the process is stored in tank 12 and is passed into catalyst preparation tank 18 through line 13. The reducible metal compound is stored in tank 14 and is passed into catalyst preparation tank 18 through line 15. The inert liquid diluent in which a reducing metal compound and reducible metal compound are mixed is introduced from tank 20 through line 19 to catalyst preparation tank 18. The resultant suspension of catalyst in inert liquid diluent is maintained in this form by means of agitator 17 driven by motor 16. The catalyst suspension in tank 18 is passed to reactor 10 through line 11. The monomer such as ethylene, propylene, etc. or mixtures thereof is introduced to polymerization reactor 10 through line 22. Inert liquid diluent is introduced to reactor 10 from tank 20 through line 23. The resultant reaction mixture in reactor 10 is thoroughly mixed by means of agitator 25 driven by motor 26.

The resultant reaction mixture is withdrawn from reactor 10 through line 27 and is passed to filter 30 wherein the polymeric product is separated from the remainder of the reaction mixture. The polymeric product is then passed through line 39 to washing apparatus 40. The remainder of the reaction mixture which is chiefly inert liquid diluent is withdrawn from filter 30 through line 31. The polymerization process may be carried out either on a batch or continuous basis. In a continuous operation, the inert liquid diluent (containing a small amount of catalyst, etc.) is preferably continuously recycled back to tank 20 for subsequent use in the polymerization process carried out in reactor 10. In certain instances, a small amount of catalyst deactivator may be added to the polymerization reaction mixture passing from reactor 10 through line 27 by means of line 29. Such catalyst deactivators include alcohols, acetone and the like. However, generally, this is not usually a preferred method of operation since it is usually desirable to recycle the inert liquid diluent to the polymerization process and in this case the catalyst deactivator would act as a polymerization poison.

The polymeric product in washing apparatus 40 is combined with a wash solution of the present invention, namely a washing agent (e.g. alcohol) containing a small amount of chelating agent. The wash solution is passed through line 41 from tank 42. The polymeric product and wash solution are thoroughly admixed in washing apparatus 40 by means of stirrer 43 operated by motor 44. Then the wash solution is separated (e.g. by filtration) from the polymeric product, the wash solution being passed through line 45 to tank 42 and the polymeric product being passed through line 52 to drier 53 and thereafter through line 54 to packaging apparatus 55 and is removed therefrom through line 56.

For the most effective washing operation in washing apparatus 40, the wash solution introduced thereto through line 41 from tank 42 is preferably essentially free of metal contaminants. It is of course desirable to be able to reuse the wash solution. Conventional methods of removing metal contaminants from the wash solution such as distillation are relatively ineffective and uneconomical. In accordance with the present invention, these problems are eliminated by contacting the wash solution with ion exchange resin. Thus according to the present invention, the wash solution is passed from tank 42 through lines 41 and 46 to contacting chamber 47 which contains ion exchange resin, preferably in the form of bed 48. The treated and purified wash solution is then passed through lines 49 and 41 to washing apparatus 40.

In the preferred contacting operation, the wash solution is passed through a bed of the ion exchange resin. However, it will be understood that other contacting techniques may be employed such as, for example, mixing the ion exchange resin in particle form with the wash solution. In this latter case, about 0.5 to 50, preferably about 2 to 20 parts by volume of wash solution per part by volume of ion exchange resin may be employed. Generally, mixing times of about 1 to 60 minutes, preferably about 3 to 30 minutes will be employed. In the preferred method of operation wherein the wash solution is passed through a bed of ion exchange resin, treating rates up to about 1000, preferably about 5 to 150 v./v./ hour (volume of liquid/volume of resin/hour) will be employed. In this method of operation, the bed of ion exchange resin is generally replaced when the percent of metal removal from the wash solution drops below about 50%, preferably below 90% and more preferably below 99%. Generally this contacting operation will be carried out at temperatures of about atmospheric temperature to 250° F. (e.g. about 120° to 200° F.). Usually it will be most convenient to carry out the contacting operation at about the same temperature as the washing step, viz. about 120°–200° F. and atmospheric pressure. Higher or lower pressures may be employed if desired.

It is particularly preferred to carry out the washing operation in washing apparatus 40 on a continuous basis. In this case, the separated polymeric product from filter 30 is continuously passed to washing apparatus 40 and wash solution is also continuously introduced thereto through lines 49 and 41. The polymeric product and wash solution are thoroughly mixed by means of stirrer 43 and washed polymeric product is continuously withdrawn through line 52 and wash solution continuously withdrawn through line 45 for passage to tank 42. The wash solution is continuously passed from tank 42 through lines 41 and 46 into contacting chamber 47 and through bed 48 and then passed continuously through lines 49 and 41 to washing apparatus 40 to thus complete the cycle. In this way, it is possible to wash the polymeric product in washing apparatus 40 with a wash solution which is essentially free of metal contaminants.

In another embodiment of the present invention, the polymeric product which is separated by filtration from the inert liquid diluent in filter 30 is passed through lines 39 and 79 to treater 80 which is provided with agitator 81 operated by motor 82. Ion exchange resin is introduced into treater 80 through line 84, and wash solution is introduced through line 86. The contents of treater 80 are then thoroughly mixed by means of agitator 81. Generally the contacting of the polymeric material with the wash solution and ion exchange resin is carried out at a temperature of about atmospheric to 250° F. (e.g. about 120 to 200° F.) in treater 80. The residence time of the polymeric material in treater 80 will generally be about 15 minutes to 2 hours, preferably about 30 minutes to 1 hour. About 10 to 200, preferably about 50 to 160 parts by volume of polymer-wash solution mixture are employed in treater 80 per part by volume of ion exchange resin. About 5 to 25, preferably about 10 to 20 parts by volume of wash solution will be employed in treater 80 per part by volume of polymeric material. The mixture in treater 80 is then passed through line 88 to separator 90 wherein the polymeric product is separated from the ion exchange resin and the wash solution. The polymeric product is then passed through lines 91 and 52 to drier 53 and thereafter through lines 54 to packaging apparatus 55 and is withdrawn therefrom through line 56. The wash solution is withdrawn from separator 90 through line 93 and is passed through line 45 to tank 42. The wash solution may then be recycled through lines 41 and 86 to treater 80. However, preferably the wash solution is recycled through lines 41, 46, bed 48 of ion exchange resin and lines 49 and 86 to treater 80. The ion exchange resin is withdrawn from separator 90 through line 95 and may then be regenerated and then recycled through line 84 to treater 80.

Any conventional method of separation may be employed in separator 90. For example, the wash solution may be separated from the ion exchange resin and the polymeric material by simple filtration or centrifuging, and the polymer may be separated from the ion exchange resin by classification, tabling, jigging, flotation, etc. The preferred method of separation is carried out as follows:

The mixture of ion exchange resin, polymer, and wash solution is passed into a standard classifier, wherein the larger particles of ion exchange resin are allowed to settle out, being washed countercurrently with a small stream of clean wash solution. The wash solution and polymer are then passed to a filter or centrifuge which separates polymer from wash solution. If desired, a secondary classification can follow the first classification to remove particles of fractured ion exchange resin and a small amount of the largest sized polymer particles. In this arrangement, the first classifier would be run at condition to yield a maximum yield of an ion exchange resin, and the second operated to give an extremely clean separation (with a small loss in yield) of resin fragments from the polymer. The treating of the reaction mixture with ion exchange resin in treater 80 and the subsequent separation of the materials in separator 90 may be carried out on either a batch or continuous basis, as desired.

The ion exchange resins employed as described above for removing metal contaminants from the wash solution may be regenerated by techniques well known in the art this may be accomplished by displacing the wash solution with solvent of increasing polarity, then water containing about 70% HCl or $H_2SO_4$, followed by displacement of the water phase with solvent of decreasing polarity until the liquid phase was wash solution.

However, preferably the ion exchange resins are regenerated by treatment with a halogen acid in a non-aqueous solvent. Preferably the halogen acids are anhydrous HCl or HBr and the non-aqueous solvent is a hydrocarbon such as heptane or benzene or a chlorinated solvent such as chloroform or carbon tetrachloride. Generally, the regeneration step is carried out at a temperature of about 60 to 280° F., preferably about room temperature. The regeneration may be carried out on either a batch basis or a continuous basis. The amount of anhydrous halogen acid employed should be sufficient to remove at least about 50%, preferably at least about 90% and more preferably at least about 99% of the metal contaminants held by the ion exchange resin. This regeneration is preferably carried out in non-aqueous media in order that wash solution and/or washing alcohol treated with the resin will not contain traces of water, since water has been found to inhibit the washing efficiency of alcohols, even when present in the concentrations of 10–100 p.p.m.

The invention will be more fully understood by reference to the following example. It is pointed out, however, that the example is given for the purpose of illustration only and is not to be construed as limiting the scope of the present invention in any way.

*Preparation of polyethylene*

A polyethylene product having a molecular weight of about 43,000 was prepared in the following manner:

Into a 100 gallon stainless steel, agitated, jacketed autoclave were introduced 25 gallons of a dried acid washed petroleum fraction boiling between 400–500° F.
563 grams of $TiCl_4$
176 grams of $AlEt_2Cl$ After agitating the mixture for 15 minutes at 78° F., 15 additional gallons of diluent were added, and ethylene gas, at substantially atmospheric pressure was introduced through diplegs into the reactor at a rate of 8–10 lbs./hr. Simultaneously, the reactor contents were heated to 175° F. by introducing hot water into the reactor jacket. Thereafter, the temperature was maintained at this level by adjusting the jacket water temperature. After 12 hours, ethylene was cut out, and 5 gallons of n-butanol were added to the reactor to terminate the polymerization reaction. This slurry is designated "A." A portion of slurry, "A," was taken and the polyethylene removed therefrom by filtering said slurry through a fritted glass filter while keeping the entire system under a blanket of nitrogen gas. The polyethylene, allowed to drain dry, is hereinafter designated "B."

*Treatment of alcohol with resin*

Normal butanol was employed to wash the filtered polymeric product "B." The filtered polymer "B" was transferred to a washing tank and slurried with n-$C_4H_9$OH at 180–200° F. for one hour and drained. The washed polymer was then reslurried in n-butanol in similar fashion and washed a second time. A portion of the first wash alcohol was then passed through a bed of an acid form ion exchange resin (10 volumes alcohol/volume resin) in about 10 minutes. The ion exchange resin employed is manufactured by the Rohm and Haas Company of Philadelphia, Pa., and is sold under the trade name of Amberlite IR–120.

This ion exchange resin contains about 92 weight percent styrene monomer and about 8 weight percent divinyl benzene monomer (based on unsulfonated resin) and is sulfonated to incorporate about 40 weight percent sulfonate groups based on total dry sulfonated resin. Prior to the treating of the alcohol, the ion exchange resin was converted to the acid form as follows:

(1) Rinsed 4 times with 10 volumes of 10% HCl to convert to acid form.
(2) Rinsed with distilled water to neutrality.
(3) Rinsed 3 times with 70% isopropanol.
(4) Rinsed 3 times with 99% isopropanol.
(5) Rinsed 3 times with 99% n-butanol.

The efficiency of metal removal from the wash alcohol by contacting with the ion exchange resin is shown below:

| Treatment | Weight Percent Al | Weight Percent Ti | Weight Percent Fe |
|---|---|---|---|
| None | 0.007 | 0.014 | 0.001 |
| Resin Treated | 0.001 | 0.004 | 0.0001 |

*Treatment of alcohol-chelating agent with resin*

Following the second n-butanol wash employed as described above, the polymeric material (designated "B" before washing) was slurried in a mixture comprising 0.9% acetyl acetone and 99.1% n-butanol for one hour at 180–200° F. The wash liquid was then separated from the polymer. A portion of the wash liquid was treated with the acid form of the ion exchange resin. This was carried out by passing the wash liquid through a bed of the ion exchange resin (10 volumes of wash liquid/volume of resin) in about 10 minutes at about room temperature. The efficiency of metal removal from the wash solution by treatment with the ion exchange resin is shown below:

| Treatment | Wt. Percent Al | Wt. Percent Ti | Wt. Percent Fe | Wt. Percent Acetyl Acetone |
|---|---|---|---|---|
| None | 0.004 | 0.004 | 0.035 | 0.90 |
| Resin Treated | 0.00006 | 0.0001 | 0.0002 | 0.90 |

The above data show that a wash liquid containing a chelating agent can be regenerated without loss of chelating agent by passing it through a bed of ion exchange resin, and that the treated wash liquid is ready for further use without further treatment. These data further show that the presence of a chelating agent substantially improves the effectiveness of the metals removal by ion exchange resin from the wash liquid.

What is claimed is:

1. In the process of preparing solid polymeric material by polymerizing olefinic hydrocarbon monomers selected from the group consisting of ethylene and propylene in the presence of catalyst obtained by mixing a reducing organo-aluminum compound with a reducible metal compound, of the group consisting of group IVB through VIB and group VIII of the periodic table the improvement which comprises washing said solid polymeric material with a non-aqueous $C_1$ through $C_5$ alkanol liquid wash solution containing about 0.5 to 5 wt. % of a 1,3 dicarbonyl compound which corresponds to the formula X—CO—CHZ—CO—Y, X, Y, and Z being members of the group consisting of hydrogen, hydroxyl, oxyalkyl radicals of 1 to 6 carbon atoms, alkyl radicals of 1 to 6 carbon atoms, and aryl radicals to remove metal contaminants from said polymeric material, contacting said wash solution containing said chelating agent with a cation exchange resin in the acid form to remove metal contaminants from said wash solution and recycling the thus treated wash solution to the washing step.

2. Process according to claim 1 wherein said dicarbonyl compound is a diketone.

3. In the process of preparing a solid polymer by polymerizing a $C_2$–$C_3$ olefinic hydrocarbon in the presence of catalyst obtained by mixing a reducing aluminum alkyl compound with a reducible titanium halide, the improvement which comprises washing said solid polymer with a non-aqueous $C_1$ to $C_5$ alkanol solution containing a small amount, about 0.5 to 5 wt. % of 1,3 dicarbonyl compound selected from the group consisting of acetylacetone and ethyl acetoacetate to remove metal contaminants from said polymer, then contacting said alkanol solution containing said dicarbonyl compound with the acid form of a cation exchange resin in the acid form to remove metal contaminants from said alkanol solution and recycling the thus treated alkanol solution to the washing step.

4. Process according to claim 3 wherein said alcohol is butyl alcohol.

5. Process according to claim 3 wherein said dicarbonyl compound is acetyl acetone.

6. An improved method for preparing polyethylene which comprises polymerizing ethylene in the presence of a polymerization catalyst obtained by mixing diethyl aluminum chloride with titanium tetrachloride, separating the resultant polyethylene from the reaction mixture, washing the separated polyethylene with a wash solution of butyl alcohol containing 0.1 to 10% of acetyl acetone to remove metal contaminants from said polyethylene, separating the wash solution from the washed polyethylene, passing the separated wash solution through a bed of ion sulfonated styrene-divinylbenzene copolymer exchange resin in acid form to remove metal contaminants from said wash solution, and recycling the wash solution to said washing step.

References Cited in the file of this patent

UNITED STATES PATENTS

| | | |
|---|---|---|
| 2,366,007 | D'Alelio | Dec. 26, 1944 |
| 2,367,803 | Schinder | Jan. 23, 1945 |
| 2,441,423 | Elliot | May 11, 1948 |
| 2,628,193 | D'Alelio | Feb. 10, 1953 |
| 2,631,127 | D'Alelio | Mar. 10, 1953 |
| 2,765,284 | Bersworth | Oct. 2, 1956 |
| 2,814,610 | Braidwood et al. | Nov. 26, 1957 |
| 2,827,445 | Bartolomeo | Mar. 18, 1958 |
| 2,845,412 | Heyson | July 29, 1958 |

FOREIGN PATENTS

| | | |
|---|---|---|
| 533,362 | Belgium | May 16, 1955 |

OTHER REFERENCES

Ion Exchange Resins, 1951, by Kumin, page 139.

"Chemistry of the Metal Chelate Compound," by Martell (1952), page 458.